(12) United States Patent
Bohn et al.

(10) Patent No.: US 7,895,210 B2
(45) Date of Patent: Feb. 22, 2011

(54) METHODS AND APPARATUSES FOR INFORMATION ANALYSIS ON SHARED AND DISTRIBUTED COMPUTING SYSTEMS

(75) Inventors: Shawn J. Bohn, Richland, WA (US); Manoj Kumar Krishnan, Richland, WA (US); Wendy E. Cowley, Richland, WA (US); Jarek Nieplocha, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 596 days.

(21) Appl. No.: 11/540,240

(22) Filed: Sep. 29, 2006

(65) Prior Publication Data

US 2008/0082520 A1  Apr. 3, 2008

(51) Int. Cl.
*G06F 17/30* (2006.01)

(52) U.S. Cl. .................. 707/741; 707/748; 707/796

(58) Field of Classification Search .................. None
See application file for complete search history.

(56) References Cited

U.S. PATENT DOCUMENTS

| | | | |
|---|---|---|---|
| 5,920,854 A * | 7/1999 | Kirsch et al. ................. | 1/1 |
| 6,484,168 B1 | 11/2002 | Pennock et al. | |
| 6,772,170 B2 * | 8/2004 | Pennock et al. ............. | 707/102 |
| 7,007,035 B2 * | 2/2006 | Kamath et al. .............. | 707/102 |
| 7,058,952 B1 * | 6/2006 | Garth et al. ................. | 718/105 |
| 2004/0098372 A1 * | 5/2004 | Bayliss et al. ............... | 707/3 |
| 2004/0220944 A1 * | 11/2004 | Behrens et al. ............. | 707/100 |
| 2005/0010560 A1 * | 1/2005 | Altevogt et al. ............. | 707/3 |

OTHER PUBLICATIONS

Gallant et al., "HNC's MatchPlus System," SIGIR Forum, 1992, p. 34-38, 26(2).
Nieplocha et al., "Advances, Applications and Performance of the Global Arrays Shared Memory Programming Toolkit," Int. J. of High Perf. Comp. Apps., 2006, p. 203-231, 20(2).
Ohm Sornil, Parallel inverted index for large-scale, dynamic digital libraries, Jan. 25, 2001, Ph.D. Dissertation from Virginia Polytechnic Inst.

* cited by examiner

*Primary Examiner*—Cheyne D Ly
*Assistant Examiner*—Anh Tai V Tran
(74) *Attorney, Agent, or Firm*—Allan C. Tuan (57) ABSTRACT

Apparatuses and computer-implemented methods for analyzing, on shared and distributed computing systems, information comprising one or more documents are disclosed according to some aspects. In one embodiment, information analysis can comprise distributing one or more distinct sets of documents among each of a plurality of processes, wherein each process performs operations on a distinct set of documents substantially in parallel with other processes. Operations by each process can further comprise computing term statistics for terms contained in each distinct set of documents, thereby generating a local set of term statistics for each distinct set of documents. Still further, operations by each process can comprise contributing the local sets of term statistics to a global set of term statistics, and participating in generating a major term set from an assigned portion of a global vocabulary.

25 Claims, 4 Drawing Sheets

METHODS AND APPARATUSES FOR INFORMATION ANALYSIS ON SHARED AND DISTRIBUTED COMPUTING SYSTEMS

STATEMENT REGARDING FEDERALLY SPONSORED RESEARCH OR DEVELOPMENT

This invention was made with Government support under Contract DE-AC05-76RL01830 awarded by the U.S. Department of Energy. The Government has certain rights in the invention.

BACKGROUND

Information analysis systems and methods that provide capability to quickly and automatically analyze information, characterize information, and/or separate portions of information that are relevant to a particular problem or useful in a particular inquiry from portions that are not relevant or useful are increasingly valuable given the growing number and size of sources of such information. The systems and methods, which can comprise analytics software, can unveil common themes and reveal hidden relationships within the information being analyzed. However, the very large volumes of data often associated with information analysis and the complexity of the algorithms underlying the analytics software can stress, and even overwhelm, standard computer desktop technology, limiting the problem sizes that can be handled effectively. Therefore, a need exists for methods and systems for analyzing information on shared and distributed computing systems.

DESCRIPTION OF DRAWINGS

Embodiments of the invention are described below with reference to the following accompanying drawings.

DETAILED DESCRIPTION

At least some aspects of the disclosure provide apparatuses and computer-implemented methods for analyzing, on shared and distributed computing systems, information comprising one or more documents. Exemplary apparatuses and methods can process data at high throughput rates, enabling very fast analysis and/or capacity for processing massive amounts of data. The data can be structured and/or unstructured in computer-readable documents. The results of such analysis can provide a set of major terms that are highly predictive of document content as well as insight regarding the content and structure of the corpus of information being analyzed.

A shared and distributed computing system, as used herein, can refer to a plurality of interconnected computing devices comprising one or more processors, which can each execute at least one process, and a global pool of memory accessible by all processes. Access to the global pool of memory can be uniform or non-uniform. A process, as used herein, can refer to a single running instance of a program. In contrast, a processor refers to a computational hardware unit typically configured to execute one process at a time. One example of a shared and distributed computing system can include a plurality of interconnected desktop computers, each comprising a single core processor. Another example can include a single desktop computer or server having one or more multi-core processors or a plurality of interconnected processors on a shared-memory board. In both examples, each processor can be associated with a local memory in addition to the global pool of memory.

In one embodiment of the present invention, information analysis on shared and distributed computing systems comprises distributing one or more distinct sets of documents among each of a plurality of processes, wherein each process performs operations on a distinct set of documents substantially in parallel with other processes. Operations by each process can further comprise computing term statistics for terms contained in each distinct set of documents, thereby generating a local set of term statistics for each distinct set of documents. Still further, operations by each process can comprise contributing the local sets of term statistics to a global set of term statistics, and participating in generating a major term set from a portion of a global vocabulary, wherein each process is assigned a portion of the global vocabulary and filters the terms in its assigned portion based on the global set of term statistics. As used herein, the global vocabulary contains associations between unique terms in the corpus of information with global term IDs and can be accessed by all processes of the shared and distributed computing system.

Terms, as used herein, can refer to a sequence of machine-recognizable or human-recognizable symbols and/or patterns. Exemplary terms can include, but are not limited to natural language words, numbers, cybersecurity IP addresses, data packets, gene sequences, character patterns, and byte patterns. Major terms, as used herein, can refer to the subset of terms that are highly discriminative in a document and/or in the corpus of information. Accordingly, major terms can be especially descriptive and/or predictive of content, meaning, and/or significance.

Term statistics, as used herein, can refer to quantifiable information describing observances of terms within documents and/or the corpus of information. Examples of term statistics include, but are not limited to, term frequency, term placement, and term overlap. Term overlap can refer to a measure of words whose placement in a document and/or the corpus of information, are highly correlated with one and another.

Another embodiment encompasses an apparatus for analyzing information comprising one or more documents. The apparatus comprises a plurality of operably-connected processors, each executing one process at a time. At least two of the processes operate on distinct sets of the documents substantially concurrently. Each of the processors is configured to compute local term statistics, to contribute local term statistics to a global term statistics set, and to participate in the generation of a major term set from a portion of a global vocabulary, wherein each process is assigned a portion of the global vocabulary and filters the terms in its assigned portion based on the global set of term statistics.

Figure 1:
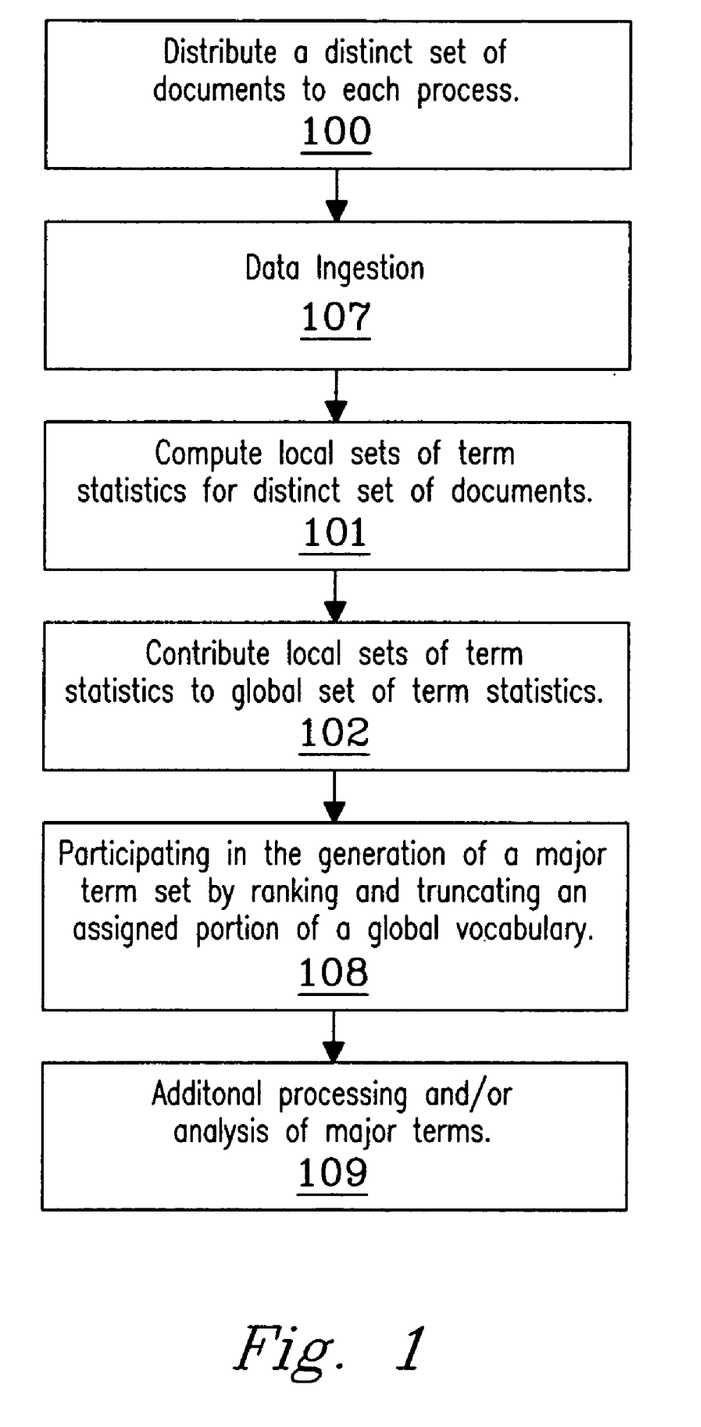
FIG. 1 is a block diagram depicting an embodiment of a method for analyzing information using a shared and distributed computing system.

Referring to FIG. 1, a flowchart depicts one embodiment of a computer-implemented method for analyzing information comprising one or more documents. A corpus of information, divided into distinct sets of documents, is first distributed 100 among a plurality of processes, wherein each of the processes performs operations on a distinct set of documents substantially concurrent with one another. While a distinct set of documents can be distributed to each process, in some instances, load balancing can be employed, wherein one process can temporarily operate on at least a portion of another process' distinct set of documents. For example, should one process complete its operations on its set of documents, rather than remaining idle, it can temporarily contribute its processing capability to performing operations on another process' distinct set of documents. Accordingly, the load balancing can occur dynamically to maximize the processing efficiency of the shared and distributed computing system.

After distribution of the corpus of information to the processes, the data is ingested 107. Exemplary ingestion can include scanning documents, tokenizing terms in the documents, and generating indices that relate terms and the documents in which they are observed. In some embodiments, each unique term in a distinct set of documents is associated with a local ID and each unique term in the corpus of information is associated with a global ID, which associations can be stored in local and global vocabularies, respectively. Exemplary IDs can include, but are not limited to, short values, integer values, and long values.

Subsequently, the method performed by each process comprises computing 101 term statistic for terms contained in the process' distinct set of documents. The term statistics can then be contributed 102 to a global set of term statistics. The global set of term statistics can be used as at least part of the basis for generation of a major term set. Each process participates 108 in generating the major term set by filtering the terms in an assigned portion of a global vocabulary. As illustrated, filtering can comprise ranking and truncating the terms in the assigned portion according to criteria and thresholds that are based on the global set of term statistics.

Exemplary ranking and truncating 108 can comprise computing topicality rankings for the terms in the assigned portion, arranging the ranked terms in a list, wherein the most relevant terms are placed at the top of the list. The arranged list can then be truncated to exclude the least relevant terms. The lists from each process can then be merged into a global topicality list. A major term set can be generated by ranking and truncating the global topicality list. In one embodiment, the size of the major term set is predetermined by defining the maximum number of allowable number of uniquely ranked terms in the major term set. More generally, the size of the major term set can be predetermined and the coarseness of the applied filtering can be adjusted to accommodate the predetermined size.

Alternatively, exemplary filtering can comprise applying a filter to the terms of an assigned portion of the global vocabulary. Examples of term filters can include, but are not limited to, frequency filters, topicality filters, and overlap filters. One embodiment of a frequency filter can measure the absolute number of occurrences of each term in the document, set of documents, and/or corpus of information and discard those that fall outside of a predetermined upper and lower frequency range. An embodiment of a topicality filter can compare the placement of each term within the document, set of documents, and/or corpus of information with the expected placement assuming the term was randomly distributed. One embodiment of an overlap filter uses second order statistics to compare terms to determine those terms whose placement in the document, set of documents and/or corpus of information are highly correlated with one and another. Additional term filters exist and can be appropriately substituted for those described herein.

Once generated, the major term set can be provided for additional processing and/or analysis 109 of the documents in the corpus of information, and/or the corpus itself. In one embodiment, the additional analysis 109 can comprise generating a conditional probability matrix comprising a primary set of terms defining a first dimension of the matrix and a secondary set of terms defining a second dimension of the matrix. The primary set of terms can comprise at least a portion of the major term set and the secondary set of terms can comprise discriminatory features identified in the corpus of information. The discriminatory features can be a simple or complex mapping of features in the corpus. Examples of a secondary set of terms can be a subset of the primary set of terms that has been aggregated, filtered, truncated, or combinations thereof. Additional examples of features can include, but are not limited to, entities (e.g., persons, places, events, and organizations), N-grams, social network characteristics, and clusters of the features. The entries in the matrix can comprise the conditional probability that a document contains a term, or feature, from the secondary set given that it contains a term from the primary set.

Figure 2:
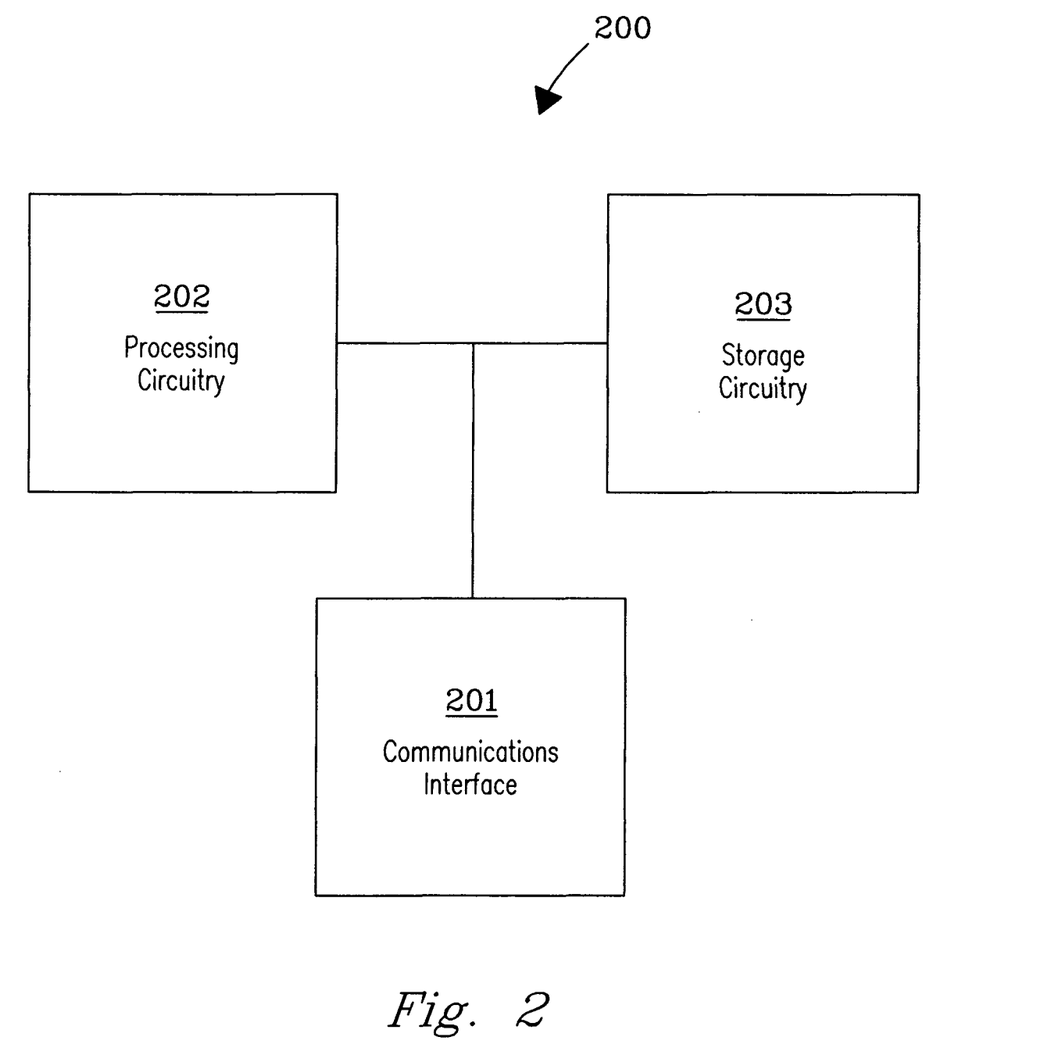
FIG. 2 is a block diagram illustrating one of a plurality of devices participating in a shared and distributed computing system according to embodiments of the present invention.

Referring to FIG. 2, an exemplary apparatus 200 is illustrated for analyzing information comprising one or more documents, wherein apparatus 200 is one of a plurality of devices participating in a shared and distributed computing system. In the depicted embodiment, apparatus 200 is implemented as a computing device such as a work station, server, a handheld computing device, or a personal computer, and can comprise a communications interface 201, processing circuitry 202, and storage circuitry 203. Other embodiments of apparatus 200 can include more, less, and/or alternative components.

The communications interface 201 is arranged to implement communications of apparatus 200 with respect to other devices in the shared and distributed computing system, a network, the internet, an external device, a remote data store, etc. Communication interface 201 can be implemented as a network interface card, serial connection, parallel connection, USB port, SCSI host bus adapter, Firewire interface, flash memory interface, floppy disk drive, wireless networking interface, PC card interface, PCI interface, IDE interface, SATA interface, and/or any other suitable arrangement for communicating with respect to apparatus 200. Accordingly, communications interface 201 can be arranged, for example, to communicate information bi-directionally with respect to apparatus 200.

In an exemplary embodiment, communications interface 201 can interconnect apparatus 200 to one or more other devices (i.e., nodes) that are configured to participate in a shared and distributed computing system. In one instance, communications interface 201 can link the storage circuitry 203 of apparatus 200 to the storage circuitry of other nodes, which collectively comprise a globally-accessible pool of memory. The globally-accessible pool of memory can serve as a common data store for all linked devices in the shared and distributed computing system. Furthermore, the communications interface can, for example, facilitate distribution of the distinct set of documents to each node, communication of data between nodes, contribution of local sets of term statistics to the global set of terms statistics, and/or assignment of portions of the global vocabulary to the nodes. Further still, communications interface 201 can facilitate access and retrieval of information from one or more data stores containing structured and/or unstructured data that serves as the corpus of information to be analyzed by the shared and distributed computing system in which apparatus 200 participates.

Processing circuitry 202 can be arranged to execute computer-readable instructions, process data, control data access and distribution, issue commands, perform calculations, and control other desired operations. Processing circuitry 202, as a connected part of a shared and distributed computing system, can operate to compute local term statistics for terms in a distinct set of documents, to contribute the local term statistics to a global term statistics set, and participate in generating a major term set by filtering an assigned portion of a global vocabulary based on the global term statistics. In some embodiments, processing circuitry 202 can further operate to ingest data, to build forward indices, to maintain global arrays, to compute partial conditional probability matrices, and to generate document vectors.

Processing circuitry can comprise circuitry configured to implement desired programming provided by appropriate media in at least one embodiment. For example, the processing circuitry 202 can be implemented as one or more of a processor, one or more of a processor core, and/or other structure, configured to execute computer-executable instructions including, but not limited to software, middleware, and/or firmware instructions, and/or hardware circuitry. Exemplary embodiments of processing circuitry 202 can include hardware logic, PGA, FPGA, ASIC, state machines, and/or other structures alone or in combination with a processor. The examples of processing circuitry described herein are for illustration and other configurations are both possible and appropriate.

Storage circuitry 203 can be configured to store programming such as executable code or instructions (e.g., software, middleware, and/or firmware), electronic data (e.g., electronic files, databases, data items, etc.), and/or other digital information and can include, but is not limited to, processor-usable media. Furthermore, storage circuitry 203 can be configured to participate in a globally-accessible memory with storage circuitry from other devices in the shared and distributed computing system. One example of a globally-accessible memory is a global array comprising an array of storage circuitry from a plurality of devices in a shared and distributed computing system. Details regarding global arrays are described by Nieplocha et al. (Jarek Nieplocha, Bruce Palmer, Vinod Tipparaju, Manojkumar Krishnan, Harold Trease and Edo Apra, "Advances, Applications and Performance of the Global Arrays Shared Memory Programming Toolkit", International Journal of High Performance Computing Applications, Vol. 20, No. 2, 203-231p, 2006), which details are incorporated herein by reference. Briefly, global arrays (GA) were created to provide application programmers with an interface that allows them to distribute data while maintaining the type of global index space and programming syntax similar to that available when programming on a single processor. The goal of GA is to free the programmer from the low level management of communication and allow them to deal with their problems at the level at which they were originally formulated. At the same time, compatibility of GA with MPI enables the programmer to take advantage of the existing MPI software/libraries when available and appropriate. The variety of applications that have been implemented using Global Arrays attests to the attractiveness of using higher level abstractions to write parallel code.

Exemplary programming can include, but is not limited to, programming configured to cause apparatus 200 to analyze, in a shared and distributed computing system, information comprising one or more documents. Processor-usable media can include, but is not limited to, any computer program product, data store, or article of manufacture that can contain, store, or maintain programming, data, and/or digital information for use by, or in connection with, an instruction execution system including the processing circuitry 202 in the exemplary embodiments described herein. Generally, exemplary processor-usable media can refer to electronic, magnetic, optical, electromagnetic, infrared, or semiconductor media. More specifically, examples of processor-usable media can include, but are not limited to floppy diskettes, zip disks, hard drives, random access memory, compact discs, and digital versatile discs.

At least some embodiments or aspects described herein can be implemented using programming configured to control appropriate processing circuitry and stored within appropriate storage circuitry and/or communicated via a network or via other transmission media. For example, programming can be provided via appropriate media, which can include articles of manufacture. Such a transmission medium can include a communication network (e.g., the internet and/or a private network), wired electrical connection, and/or optical connection, for example, via a communications interface, or provided using other appropriate communication structures or media.

EXAMPLE

Figure 3A:
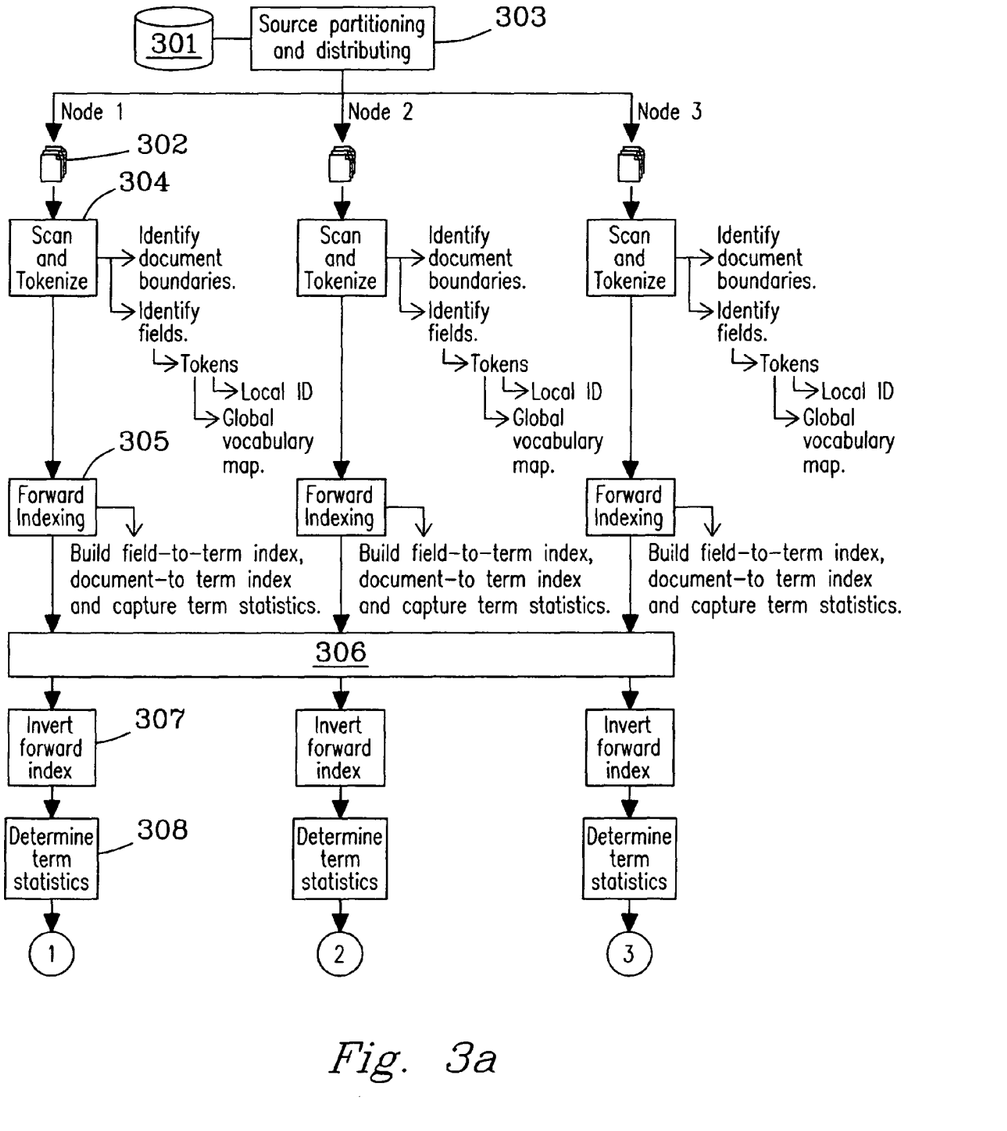
FIGS. 3a and 3b are block diagrams depicting an exemplary analysis of a corpus of data using a three-node shared and distributed computing system.
Figure 3B:
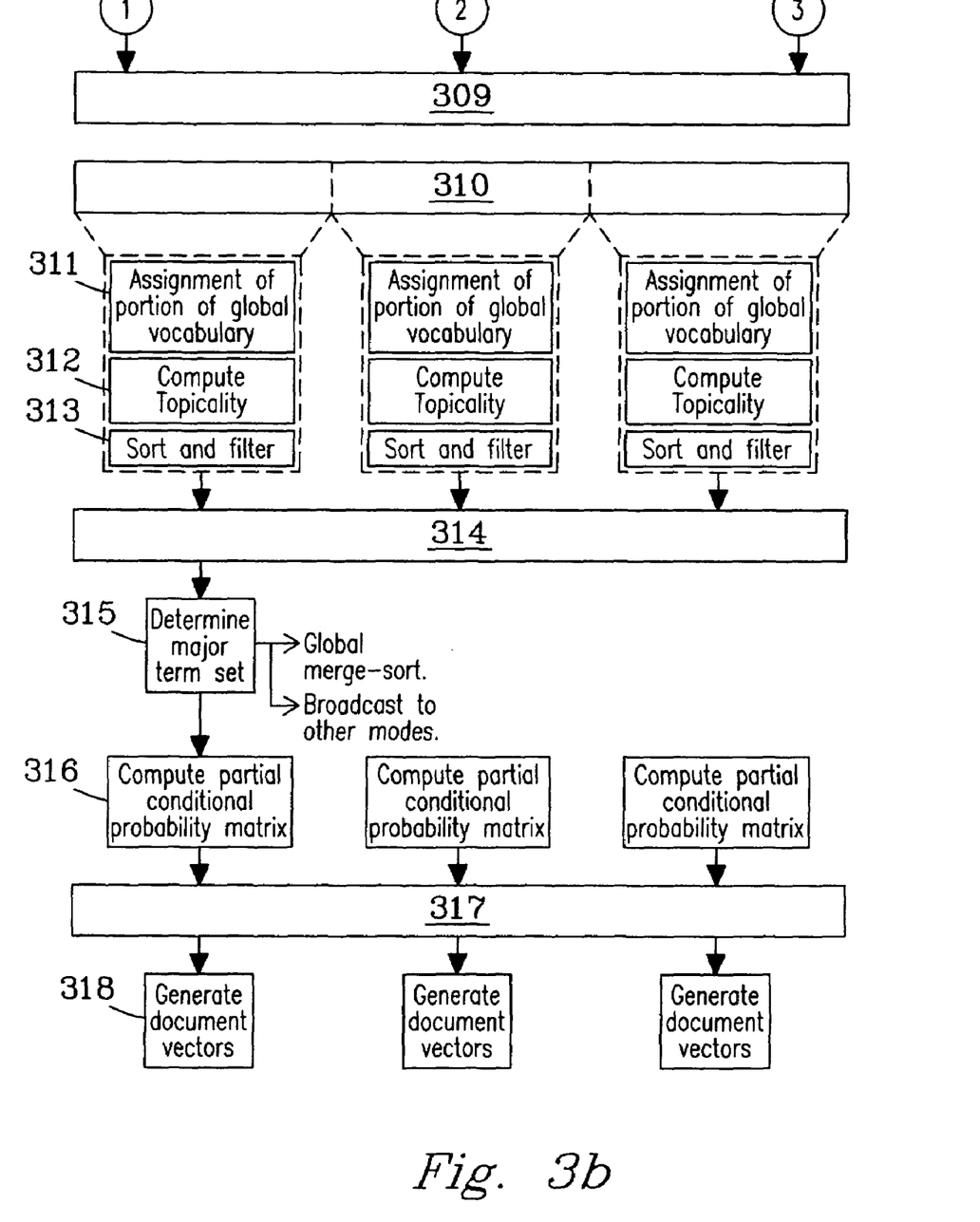

Information Analysis on a Shared and Distributed Computing System Having Three-Nodes Referring to FIGS. 3a and 3b, a method of analyzing information on a three-node, shared and distributed computing system is depicted graphically. Each node comprises a single processor and performs operations on a distinct set of documents substantially concurrently with one another. The order and the rate of operations performed by each processor is not necessarily limited by those of the other processors. In the present example, distributed sets of documents are represented as sources. A source can be implemented as a file that contains one or more documents. Each document can contain one or more fields, where a field is the smallest unit of scanning and indexing.

Initially, a corpus of information 301 is partitioned 303 into a plurality of sources 302, which are distributed, as equally as possible, among the three nodes based on the number of bytes. Exemplary partitioning and distributing can comprise using a set of virtual containers to store lists of sources, wherein each container corresponds to a processor. A median value can be computed based on total byte size and the number of containers. Using a round-robin scheme, the sources are assigned to containers starting with the largest sources and proceeding until either the median is exceeded or all sources are assigned. Partitioning and distributing can be performed prior to application executing or be done as the initial step.

Once some, or all, of the sources have been distributed among the nodes, scanning and tokenization 304 can occur. Tokenization leads to forward indexing 305, which can result, for example, in the construction of a field-to-term index and a document-to-term index. These indices can then be inverted 307 to construct term-to-field and term-to-document indices. The tokenization process can use a format structure and delimiters, such as format tags, that indicate the beginning and end of content. The format tags are typically defined a priori and are based on the content. Tags can include any consistent demarcation of a document. Examples of format tags can include, but are not limited to, XML tags, fixed positional encodings, fixed record lengths, document delimiters (e.g., title, body, page breaks, white space, etc.) and field tags.

Forward indexing 305 can comprise determining where each document starts and stops. The format structure specifies the document delimiter and each of the processes begins by scanning the bytes of a source. When a document delimiter is observed, the node scans for field tags or for the next document delimiter. If a field tag is detected, tokenization begins, which involves scanning the sequence of bytes and identifying the edge of a token. For example, a whitespace after the beginning of a token can indicate the end of the token. When two edges are found, the most probable token, according to a training set or a set of pre-determined rules, is identified. The identified token can then be processed to remove punctuation based on a pre-defined set of rules. Those rules can, for example, remove the token completely or identify multiple tokens within the sequence of characters. The tokens can then be further filtered according to a dictionary of terms (i.e., stopwords). When a set of tokens has been determined for a field, an entry is made into the field-to-term structure which associates the field ID with a list of vocabulary IDs. Depending upon memory limitations this information could either be memory resident or as will be done written to persistent storage. Likewise when all fields have been processed across all documents, a document-to-term structure is created. This structure is an aggregation of the fields for each document comprised of their vocabulary IDs. When this has been perform it is persisted to storage.

In one embodiment, each node assigns an ID to the tokens, which ID is mapped to the character representation of the token. The ID is then used in storing the index, which contains term IDs and term statistics, such as number of occurrences of a term in a field and/or document. Exemplary IDs can include, but are not limited to, short values, integer values, and long values.

While each node can operate on its source files independently during forward indexing, in some embodiments, each node submits its tokens, or local IDs, to obtain a global ID and to construct a global ID mapping. The global ID mapping allows nodes to relate local IDs to global IDs and is critical for subsequent information analysis, as described elsewhere herein, involving the entire corpus of information. Examples of suitable global vocabulary mappings include, but are not limited to global hashmaps, etc.

Once the field-to-term index has been created, it is used to create the document-to-term index. During the scanning process a structure is maintained so that each document can determine which set of fields are associated to it. Based on the structure, associations between fields and documents can be identified and the information from those fields can be aggregated with the information contained in the field-to-term index. An exemplary structure can include a mapping that defines the location with the source as to where the fields and documents start.

When all the sources have been scanned and indexed, each node can be assigned 306 a global document ID. The global document ID can be derived from a global document offset based on the node's ID. The global offset can be determined by having each process communicate via a global array the total number of documents maintained by each node. Each process then aggregates each entry in the global array to n−1, where n is the process ID. In a specific embodiment, the process ID is a sequential ID ranging from zero to n. The zeroth process ID has an offset of zero.

Once the forward indices have been processed, an index inversion 307 is performed. The end product of the inversion is that local term IDs are mapped to sets of field or document IDs. Index inversion can be achieved using standard information retrieval approaches that enable quick and efficient statistics gathering. In one embodiment, an exemplary inversion process comprises a modification of the FAST-INV algorithm for shared and distributed computing. The modifications include the addition of support structures to enable load balancing among the nodes. Load balancing can be used when the distribution of terms is not expected to be balanced in terms of the number of bytes. In such situations, certain processes will likely have greater inversion loads than others.

A local set of term statistics can then be determined 308 for terms contained in each distinct set of documents, for example, by computing the occurrence frequency, the location, etc. Document frequencies and global vocabulary IDs for the terms can also be obtained. Each process then contributes its local sets of term statistics to a global set of term statistics 309 in a collective operation.

Generation of a major term set involves filtering a global vocabulary, wherein each process is assigned 311 a portion of the global vocabulary 310 and, for example, computes 312 a topicality ranking for the terms in its assigned portion based on the global set of term statistics. The ranked terms can be sorted 313 in a list according to a predetermined criteria and the list is truncated 313 to exclude terms beyond a predetermined threshold. The truncated lists from the processes are then merged to form a global topicality list 314. The major term set is constructed 315 by ranking and truncating the global topicality list 314. In one embodiment, a single processor performs the ranking and truncating of the global topicality list to form the major term set, which is then communicated to all other nodes.

Based on the major term set, a global conditional probability matrix can be generated comprising a primary set of terms defining a first dimension of the matrix and a secondary set of terms defining a second dimension of the matrix. The primary set of terms can comprise at least a portion of the major term set and the secondary set of terms can comprise discriminatory features identified in the corpus of information. The discriminatory features can be a simple or complex mapping of features in the corpus. Examples of a secondary set of terms can be a subset of the primary set of terms that has been aggregated, filtered, truncated, or combinations thereof. Additional examples of features can include, but are not limited to, entities (e.g., persons, places, events, and organizations), N-grams, social network characteristics, and clusters of the features. The entries in the matrix can comprise the conditional probability that a document contains a term from the secondary set given that it contains a term from the primary set. The entries in the matrix can comprise the conditional probability that a document contains a term from the secondary set given that it contains a term from the primary set. The global conditional probability matrix can be determined 317 by aggregating partial conditional probability matrices from all processes. The partial conditional probability matrices are computed 316 on each process by summing the local co-occurrences of a given pair of terms from the primary and secondary sets from each distinct set of documents and normalizing by the total occurrences in all documents globally, based on the global term statistics, of the term from the primary set.

The global conditional probability matrix, which is communicated to each node, evaluates the conditional probability of each member of the secondary set of terms being present in a document, or a predetermined portion of the corpus of information that can represent a document, given the presence of each member of the primary set of terms. It can be manipulated to characterize documents and/or the corpus of information according to their context. For example, by summing the vectors of each word in a document also present in the secondary set, a unique vector for each document that measures the relationships between the document and the remainder of the corpus of information across all the parameters expressed in the secondary set can be generated 318. By comparing vectors so generated for any set of documents contained with the data set, the documents can be compared for the similarity of the resultant vectors to determine the relationship between the contents of the documents. In this manner, all of the documents contained within the corpus of information can be compared to one and another based upon their content as measured across a wide spectrum of indicating words so that documents describing similar topics are correlated by their resultant vectors. Additional details regarding conditional probability matrices and their analyses are described in U.S. Pat. Nos. 6,484,168 and 6,772,170, which details are incorporated herein by reference.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. A computer implemented method for analyzing, on shared and distributed computing systems, information comprising one or more documents, the method comprising:

distributing one or more distinct sets of the documents to each of a plurality of processors, wherein each processor of the plurality of the processors has a distinct set of document, wherein each processor of the plurality of processors executes a process that performs operations on the distinct set of the document of the one or more distinct sets of the documents substantially in parallel with other processors of the plurality of processors;

for each of the plurality of processors, performing an operation comprising:

a) computing term statistic for terms contained in each of the processor's distinct set of documents, and generating a local set of statistics for terms within the processor's distinct set of documents;

b) contributing in a collective operation performed by the processor the local set of statistics to a global set of term statistics, wherein the global set of term statistics comprises an aggregate of the local set of statistics from each and every processor of the plurality of processors;

c) distributing the global set of term statistics to each and every processor of the plurality of processors;

d) receiving a predetermined set of vocabulary from a global vocabulary;

e) filtering the terms in the predetermined set of vocabulary based on a statistics-based protocol utilizing the global set of term statistics, including ranking the predetermined set of vocabulary according to a predetermined criteria and excluding the terms based on a predetermined threshold;

f) merging the terms to a global topicality list; and g) ranking and truncating the global topicality list to form a major term set, wherein the major term set is broadcasted to each and every processor of the plurality of processors.

2. The method as recited in claim 1, wherein the global vocabulary comprises an association of each unique term in all the documents with a unique global ID.

3. The method as recited in claim 1, wherein said filtering based on a predetermined protocol and on the global set of term statistics comprises computing topicality rankings for terms in the assigned portion of the global vocabulary, sorting the ranked terms into a list according to a predetermined criteria, and truncating the list to exclude terms beyond a predetermined threshold.

4. The method as recited in claim 3, further comprising merging the truncated lists from all processes into a global topicality list.

5. The method as recited in claim 4, further comprising ranking and truncating the global topicality list to form the major term set.

6. The method as recited in claim 1, wherein said filtering comprises applying a filter selected from the group consisting of a frequency filter, a topicality filter, an overlap filter, and combinations thereof.

7. The method as recited in claim 1, further comprising generating a global conditional probability matrix comprising a primary set of terms defining a first dimension of the global conditional probability matrix and a secondary set of terms defining a second dimension of the global conditional probability matrix, wherein the primary set of terms comprises at least a portion of the major term set, the secondary set of terms comprises discriminatory features identified in a corpus of information, and entries in the global conditional probability matrix comprise the conditional probability that a document contains a term from the secondary set when it contains a term from the primary set.

8. The method as recited in claim 7, wherein the secondary set of terms comprises a subset of the primary set of terms that has been aggregated, filtered, truncated, or combinations thereof.

9. The method as recited in claim 7, wherein the global conditional probability matrix comprises an aggregate of partial conditional probability matrices from the plurality of processes.

10. The method as recited in claim 9, wherein the partial conditional probability matrices are determined by summing the co-occurrences of a given pair of terms from the primary and secondary sets from each distinct set of documents and normalizing by the total occurrences in all documents globally, based on the global term statistics, of the term from the primary set.

11. The method as recited in claim 1, wherein a first process temporarily operates on at least a portion of a second process' distinct set of documents.

12. The method as recited in claim 1, wherein the information is structured text, unstructured text, or a combination thereof.

13. A non-transitory computer-readable medium having computer-executable instructions for performing the method as recited in claim 1.

14. An apparatus for analyzing, on shared and distributed computing systems, information comprising one or more documents, the apparatus comprising:

at least one hardware memory and at least one hardware processor;

distributing one or more distinct sets of the documents to each of a plurality of processors, wherein each processor of the plurality of the processors has a distinct set of document, wherein each processor of the plurality of processors executes a process that performs operations on the distinct set of the document of the one or more distinct sets of the documents substantially in parallel with other processors of the plurality of processors;

for each of the plurality of processors, performing an operation comprising:

a) computing term statistic for terms contained in each of the processor's distinct set of documents, and generating a local set of statistics for terms within the processor's distinct set of documents;

b) contributing in a collective operation performed by the processor the local set of statistics to a global set of term statistics, wherein the global set of term statistics comprises an aggregate of the local set of statistics from each and every processor of the plurality of processors;
c) distributing the global set of term statistics to each and every processor of the plurality of processors;
d) receiving a predetermined set of vocabulary from a global vocabulary;
e) filtering the terms in the predetermined set of vocabulary based on a statistics-based protocol utilizing the global set of term statistics, including ranking the predetermined set of vocabulary according to a predetermined criteria and excluding the terms based on a predetermined threshold;
f) merging the terms to a global topicality list; and
g) ranking and truncating the global topicality list to form a major term set, wherein the major term set is broadcasted to each and every processor of the plurality of processors.

15. The apparatus as recited in claim 14, wherein said filtering comprises computing topicality rankings for the terms in the assigned portion of the global vocabulary, sorting the ranked terms into lists according to predetermined criteria, and truncating the lists to exclude terms beyond a predetermined threshold.

16. The apparatus as recited in claim 15, wherein the lists that have been truncated from the plurality of processes are merged into a global topicality list.

17. The apparatus as recited in claim 16, wherein one or more of the processors further rank and truncate the global topicality list.

18. The apparatus as recited in claim 17, wherein the size of the major term set is predetermined by defining a maximum allowable number of uniquely ranked terms.

19. The apparatus as recited in claim 14, wherein the size of the major term set is predetermined and the processors further filter the terms in the assigned portions of the global vocabulary to fit the predetermined size of the major term set.

20. The apparatus as recited in claim 14, wherein the processors further participate in generating a global conditional probability matrix comprising a primary set of terms defining a first dimension of the global conditional probability matrix and secondary set of terms defining a second dimension of the global conditional probability matrix, wherein the primary set of terms comprises at least a portion of the major term set, the secondary set of terms comprises discriminatory features identified in a corpus of information, and entries in the global conditional probability matrix comprise the conditional probability that a document contains a term from the secondary set when it contains a term from the primary set.

21. The apparatus as recited in claim 20, wherein the secondary set of terms comprises a subset of the primary set of terms that has been aggregated, filtered, truncated, or combinations thereof.

22. The apparatus as recited in claim 20, wherein the global conditional probability matrix comprises an aggregate of partial conditional probability matrices from all processes.

23. The apparatus as recited in claim 22, wherein partial conditional probability matrices are determined by summing the co-occurrences of a given pair of terms from the primary and secondary sets from each distinct set of documents and normalizing by the total occurrences in all documents globally, based on the global term statistics, of the term from the primary set.

24. The apparatus as recited in claim 14, further comprising storage circuitry as a globally accessible pool of memory to operably connected processes.

25. The apparatus as recited in claim 24, wherein the globally accessible pool of memory comprises one or more global arrays.

* * * * *